No. 775,765. PATENTED NOV. 22, 1904.
C. RENARD.
VEHICLE TRAIN.
APPLICATION FILED JAN. 7, 1904.
NO MODEL. 4 SHEETS—SHEET 1.
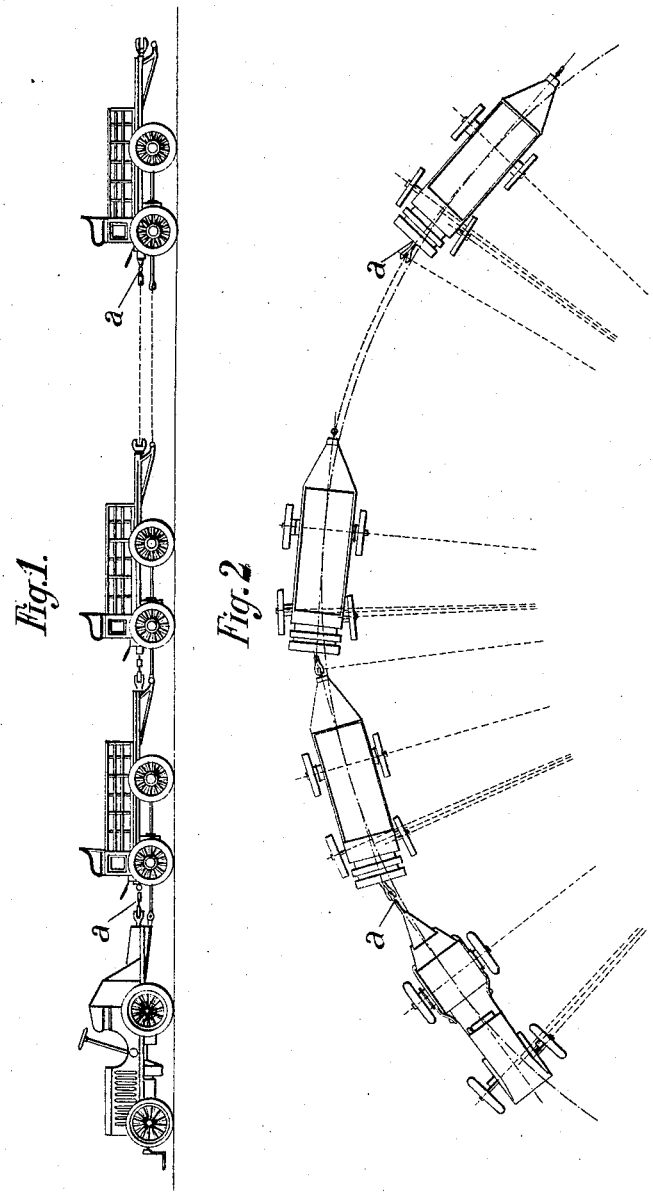

No. 775,765. PATENTED NOV. 22, 1904.
C. RENARD.
VEHICLE TRAIN.
APPLICATION FILED JAN. 7, 1904.
NO MODEL. 4 SHEETS—SHEET 2.

Witnesses:
Inventor
Charles Renard
By James L. Norris
Atty

No. 775,765. PATENTED NOV. 22, 1904.
C. RENARD.
VEHICLE TRAIN.
APPLICATION FILED JAN. 7, 1904.
NO MODEL. 4 SHEETS—SHEET 3.

Witnesses: Inventor
Charles Renard
By James L. Norris
Atty.

No. 775,765. PATENTED NOV. 22, 1904.
C. RENARD.
VEHICLE TRAIN.
APPLICATION FILED JAN. 7, 1904.
NO MODEL. 4 SHEETS—SHEET 4.

Witnesses:

Inventor
Charles Renard

No. 775,765.

Patented November 22, 1904.

UNITED STATES PATENT OFFICE.

CHARLES RENARD, OF MEUDON, FRANCE.

VEHICLE-TRAIN.

SPECIFICATION forming part of Letters Patent No. 775,765, dated November 22, 1904.

Application filed January 7, 1904. Serial No. 188,064. (No model.)

*To all whom it may concern:*

Be it known that I, CHARLES RENARD, colonel of engineers, a citizen of the French Republic, residing at Meudon, Department of Seine-et-Oise, France, have invented certain new and useful Improvements in Vehicle-Trains, of which the following is a specification.

This invention relates to what I shall for convenience term "vehicle-trains," the arrangement, according to this invention, consisting of or comprising a first vehicle or locomotive (I will call it the "motor-vehicle") carrying a driving-motor and guiding and braking devices and any number of vehicles connected therewith, so that the motor-vehicle does not haul the following vehicles by pulling them directly, but is, in effect, a traveling power-station from which the power is transmitted to the following vehicles of the train, so that all the vehicles can be made to participate in the adhesion, and in this way a light motor-vehicle can be used to cause a train as heavy as required to travel on inclines however steep, provided a system of reducing-gear be arranged between the motor-vehicle and the wheels of the following vehicles, the whole train of vehicles constituting practically a locomotive the whole of the driving-wheels of which are coupled together. This arrangement is of especial advantage for vehicles running on common roads with variable inclines; but it can also be applied to vehicles running on railways.

As will be gathered from the statement just made, the "vehicle-train," which I have selected as a convenient title for my invention, is of especial advantage when traversing common roads. It may be used with equal advantage in other connections.

Figure 3:
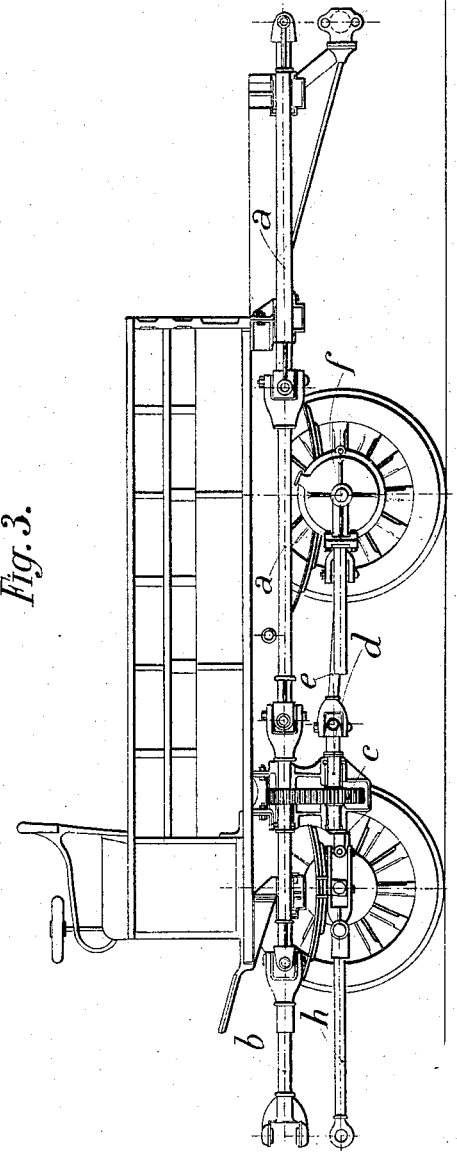
Figure 4:
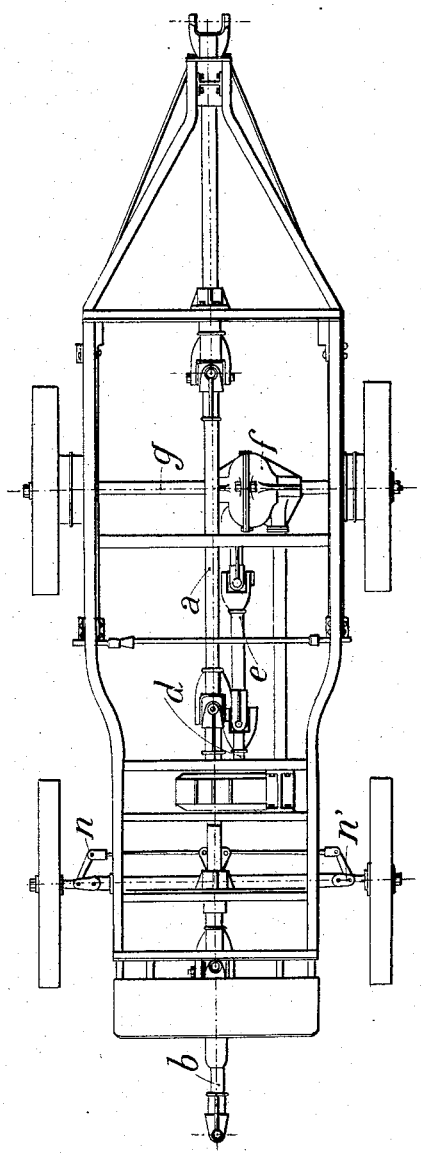
Figure 5:
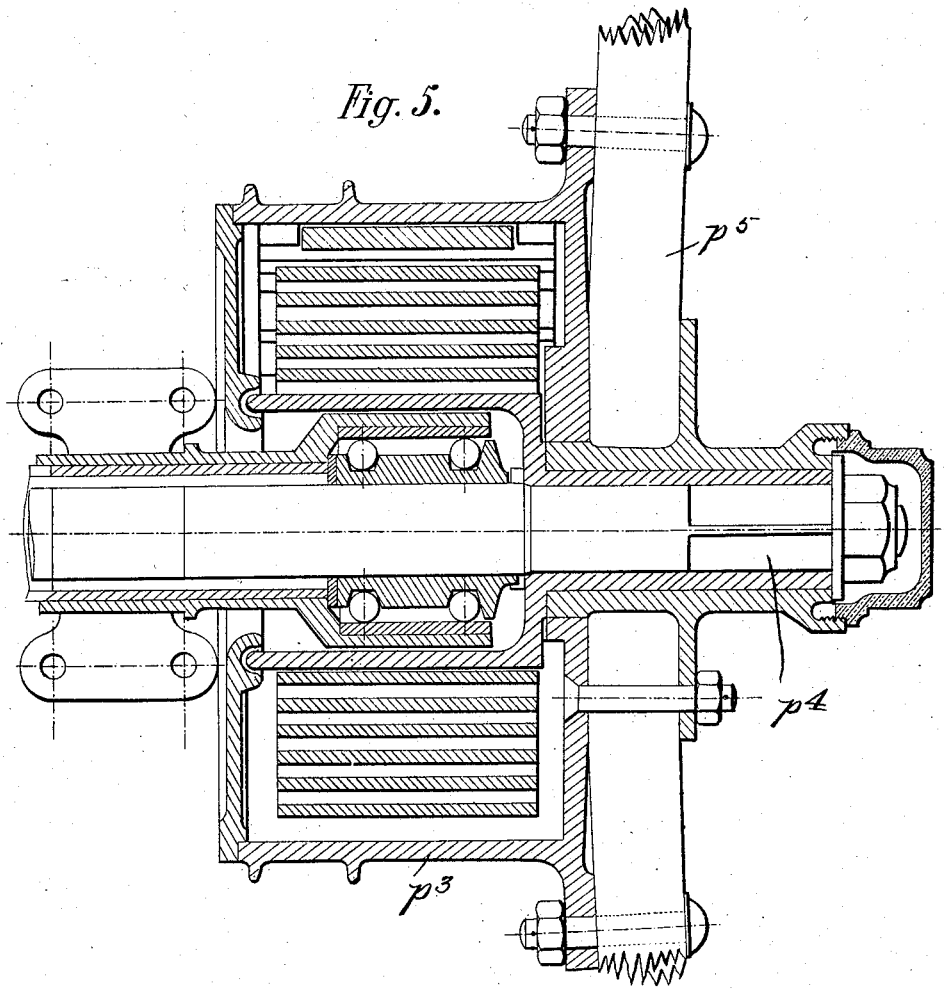
Figure 6:
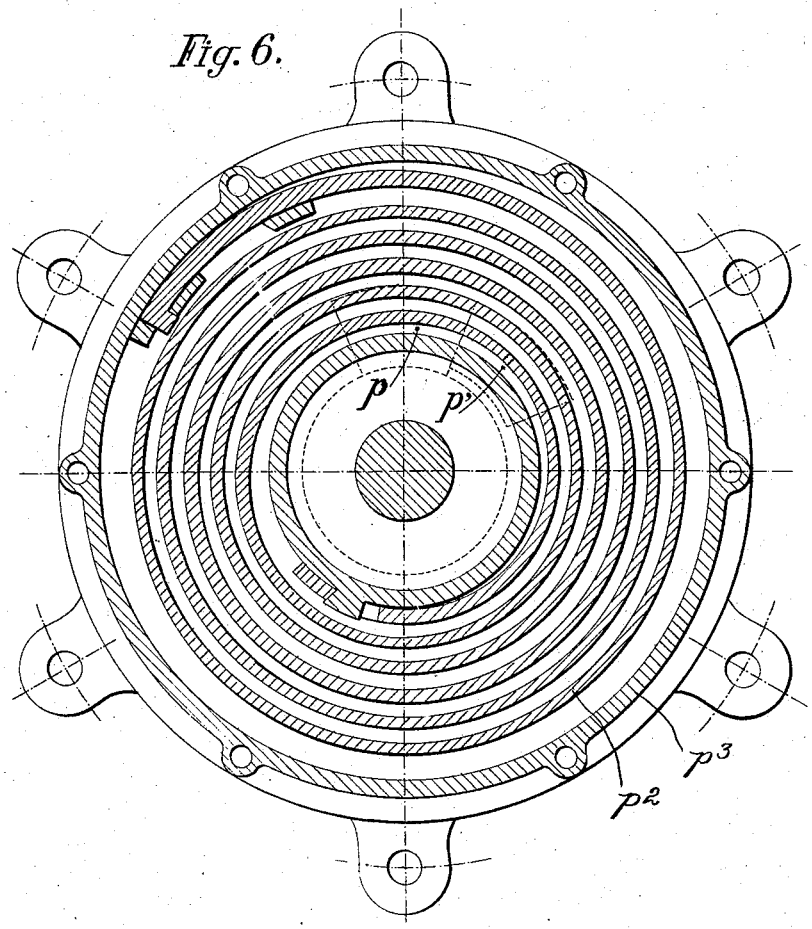

In the accompanying drawings, Figure 1 is a longitudinal elevation of a train presumed to be on a common road worked by propelling-gear in accordance with this invention. Fig. 2 is a plan of the train on a curve of constant radius. Figs. 3 and 4 show, respectively, an elevation and a plan of a four-wheeled following vehicle. Figs. 5 and 6 show compensating springs on the driving-wheel hubs.

The system, according to this invention, comprises a longitudinal shaft $a$, which I call the "train-shaft," controlled by the motor on the motor-vehicle and extending from that vehicle to the last. This shaft is divided between each two adjacent vehicles. Each vehicle carries one portion of the train-shaft mounted on the frame and consisting, if required, of several parts connected together by Cardan or other similar joints, so as to avoid jamming should the frame become bent. The ends of the shafts of two adjacent vehicles are extensibly connected by a jointed link $b$, the joints being of the Cardan or other pattern. The joints of these links are so chosen that on going around curves each jointed link is equally inclined on the two portions of the train-shaft which it connects. If a Cardan joint proper be used, the two forks at the ends of the jointed links must lie in the same plane. These conditions have to be fulfilled if it is desired that the presumably-uniform motion of the end of the shaft on the motor-vehicle remains uniform throughout the train for all the ends of the shafts on the following vehicles.

The transmission of the motion of the train-shaft to the driving-wheels may be of any suitable kind. In Figs. 3 and 4 is shown a mode of transmission without chains, the differential gear of which, arranged on the driving-axle, is actuated by a Cardan link. The train-shaft $a$ drives with or without reducing-gear, by means of a spur or conical wheel gearing $c$, a small auxiliary shaft $d$, connected by a jointed link $e$ to the differential gearing $f$ of the driving-axle $g$.

In chain-driven vehicles the driving of the train-shaft may be effected by means of spur-wheel gearing mounted on an auxiliary shaft, which in turn will drive, by means of conical gearing, the transverse shaft carrying the differential gear and the chain-wheels. A worm and worm-wheel driving directly the differential gearing or the like may also be employed.

The train-shaft, the jointed links connecting the various portions of the train-shaft, and the gearing transmitting the motion of the shaft to the driving-wheels constitute what may be called the "power-coupling;" but the vehicles are connected together by a second coupling, hereinafter referred to as the "steering-gear coupling." This steering-gear coupling, which is not required on railway-trains, is necessary for trains on common roads.

The train-shaft actuating all the vehicles so as to impart them the same running speed, it is necessary to insert between this train-shaft and the wheels an elastic arrangement permitting in special cases of the cars running at different speeds. If this arrangement were not provided, the vehicles could be constrained to slide to the fore when the train passes from a straight line to a curved line and generally when the curvature of the path increases and to slide toward the rear when the curvature decreases.

A theoretical investigation of the motion of the train shows that when the curvature of the path of the vehicles increases the length of the path (curvilinear distance measured between two rear consecutive axles) decreases, whereas when curvature of the path decreases this distance increases. In order to assume their distance, the following vehicles should therefore be constrained to slide forward in the former case and backward in the latter case. The latter case is the more dangerous, and experience shows that in extreme cases it may cause the overturning of the vehicles.

The elastic system which I use I will term a "compensator." The compensator-spring arrangement may be either within the driving-wheel hubs (in which case there will be two springs) or in the transmission-gear, which runs from the train-shaft to the differential gear. In this case there will be only one spring.

Figs. 5 and 6 show the arrangement that is adopted when the compensating springs are arranged within the hubs of the driving-wheel. This apparatus is in reality a spring $p^2$, inclosed in a barrel $p^3$, and is similar to that used in clockwork. It is at one end driven by the axle $p^4$ and drives the wheel $p^5$ by its other end. Its angular flexibility must be about three-quarters of a turn, and its maximum turning moment must not be such as to fully wind up the spring on the steepest incline of the road, (generally ten per cent.) The relative motion of the axle with regard to the road is limited by two stops $p$ and $p'$, which prevent the spring being overstrained.

When the compensator is arranged on the transmission-gear, which runs from the train-shaft to the differential gear, it may also have the shape of a spring and spring-barrel, and it may be arranged either on the shaft that actuates the jointed link when there is one, or on the wheel that gears with the wheel on the train-shaft, or on the differential gear, or at any other point between the differential gear and the train-shaft.

I do not limit myself to the use of the compensators described, for equivalent means may be employed in lieu thereof. The compensators, besides the special purpose for which they are intended, have also the advantage of rendering the starting much smoother. They are necessary for this reason alone if the driving-motor used be an explosive-engine of the type used in motor-cars. The steering-gear connection between all the vehicles through the longitudinal shaft permits also of a continuous braking of the train being effected. For this purpose a brake is arranged on the train-shaft, and it is obvious that when this brake is applied all the vehicles are at once stopped.

It has so far been supposed that all the following vehicles are mechanical vehicles—that is, vehicles provided with a longitudinal shaft and gearing transmitting motion to the wheels; but it is clear that any vehicle simply drawn by tractive power may be also coupled, provided the couplings of these vehicles satisfy the hereinbefore-stated geometrical conditions required for the proper running around curves. Mixed trains may thus be formed consisting of vehicles which are mechanically propelled and vehicles which are not mechanically propelled. It can be assumed that for trains on common roads having to ascend maximum gradients, say, of ten per cent. on an indifferently-kept road a group of mechanically-propelled vehicles is capable of hauling a group of vehicles not driven mechanically whose weight is equal to that of the mechanically-propelled vehicle. In mixed trains the continuous brake is only on the mechanically-propelled vehicles of the train and independent brakes are provided on the vehicles that are not mechanically propelled.

It has been supposed that the motor of the train is on the first vehicle, which acts also as steering-vehicle; but the motor may be on any one of the vehicles in the trains, or motors may be on several of the vehicles.

It will be obvious that my invention involves a train of vehicles consisting of a motor or driving vehicle, one or more driven vehicles, and a shaft extending longitudinally of the train operable by the motor on the driving-vehicle and means operated by said shaft for actuating the driven vehicle or vehicles.

Having now particularly described and ascertained the nature of my said invention and in what manner the same is to be performed, I declare that what I claim is—

1. A train of driving and driven vehicles, the driving-vehicle carrying a motor, a shaft extending longitudinally of the train, operable by said motor, and means operated by the shaft for actuating the driving-wheels of the driven vehicle or vehicles independently of each other.

2. A train comprising driving and driven vehicles, the driving-vehicle having a motor, a shaft extending longitudinally of the train, composed of flexible sections jointed between the several vehicles and operable by said motor, and means operated by said shaft for actuating the driving-wheels of the driven vehicles independently of each other.

3. A train comprising driving and driven vehicles, the driving-vehicle having a motor and steering means, a shaft extending longitudinally of the train, operable by said motor, and means operated by said shaft for actuating the driving-wheels of the driven vehicle or vehicles independently of each other.

4. A train comprising driving and driven vehicles, a flexible shaft extending longitudinally of the train, the driving-vehicle having a motor to operate said shaft, means actuated by said shaft for operating the driving-wheels of the driven vehicle or vehicles independently of each other, and connections between the vehicles to cause the driven vehicles to take the path of the driving-vehicle.

5. A train comprising driving and driven vehicles, a shaft extending longitudinally of the train, the driving-vehicle carrying a motor for operating the shaft, and connections between the shaft and wheels of the driven vehicles, said connections involving means to permit the shaft to turn freely when the resistance to the wheels passes a certain point.

6. A train comprising driving and driven vehicles, a shaft extending longitudinally of the train, the driving-vehicle carrying a motor for operating the shaft, and connections between the shaft and wheels of the driven vehicles, said connections having a spring to permit the shaft to turn freely when the resistance to the wheels passes a certain point.

In testimony whereof I have hereunto set my hand in presence of two subscribing witnesses.

CHARLES RENARD.

Witnesses:
 HERNANDO DE SOTO,
 A. F. VINE.